United States Patent
Boger et al.

(10) Patent No.: US 9,068,669 B2
(45) Date of Patent: Jun. 30, 2015

(54) PROCESS FLUID ACTUATED PILOT OPERATED CONTROL VALVE

(75) Inventors: Henry William Boger, Foxboro, MA (US); James Albert Stares, Norton, MA (US)

(73) Assignee: Dresser, Inc., Addison, TX (US)

( * ) Notice: Subject to any disclaimer, the term of this patent is extended or adjusted under 35 U.S.C. 154(b) by 509 days.

(21) Appl. No.: 13/489,012

(22) Filed: Jun. 5, 2012

(65) Prior Publication Data

US 2013/0319535 A1 Dec. 5, 2013

(51) Int. Cl.
*F16K 31/02* (2006.01)
*F16K 31/124* (2006.01)
*F16K 31/42* (2006.01)
*G05D 16/20* (2006.01)

(52) U.S. Cl.
CPC ............ *F16K 31/124* (2013.01); *F16K 31/42* (2013.01); *G05D 16/2093* (2013.01)

(58) Field of Classification Search
CPC .... F16K 31/124; F16K 31/42; G05D 16/2093
USPC .............................. 137/553–554, 556–556.3; 251/30.01–30.05, 129.08
See application file for complete search history.

(56) References Cited

U.S. PATENT DOCUMENTS

| 4,085,920 | A  |   | 4/1978  | Waudoit       |          |
|-----------|----|---|---------|---------------|----------|
| 4,310,143 | A  | * | 1/1982  | Determan      | 251/30.02|
| 4,596,271 | A  | * | 6/1986  | Brundage      | 251/30.01|
| 4,699,351 | A  |   | 10/1987 | Wells         |          |
| 4,779,837 | A  | * | 10/1988 | Mito et al.   | 251/30.03|
| 5,294,089 | A  | * | 3/1994  | LaMarca       | 251/30.02|
| 6,067,946 | A  | * | 5/2000  | Bunker et al. | 123/90.12|
| 6,267,349 | B1 |   | 7/2001  | Gomes et al.  |          |
| 6,328,275 | B1 |   | 12/2001 | Yang et al.   |          |
| 6,883,320 | B2 | * | 4/2005  | Tyler         | 251/30.01|
| 2010/0229975 | A1 | * | 9/2010 | Sweeney et al. | 137/556 |

* cited by examiner

*Primary Examiner* — John Bastianelli
(74) *Attorney, Agent, or Firm* — Paul Frank + Collins P.C.

(57) ABSTRACT

A flow control system includes a pilot driven valve having a pilot assembly and a main valve assembly; a displacement measurement component coupled to the main valve assembly indicating displacement of the main valve assembly; and a proportional solenoid responsive to a signal from the displacement measurement component that displaces the pilot assembly in proportion to the changes in displacement of the main valve assembly. The valve is controlled by sensing a displacement of the main valve assembly; and modulating the proportional solenoid in response to the displacement of the main valve assembly.

6 Claims, 5 Drawing Sheets

PROCESS FLUID ACTUATED PILOT OPERATED CONTROL VALVE

TECHNICAL FIELD

The subject matter disclosed herein generally relates to control valves. More specifically the subject matter relates to process fluid actuated pilot operated control valves.

BACKGROUND

Many industrial processes require the control of the flow of fluids through conduits. In some cases it is desirable to keep a process variable (e.g. pressure, flow, etc.) within an operating range. However, the flow of fluids through a conduit may be subject to disturbances that affect the process variables. To reduce the effect of disturbances, sensors and transmitters collect information about the process variable and its relationship to a set point. A controller may then determine what changes have to be implemented to get the process variable to the desired value. To effect the changes requires a control element such as a control valve. The control valve regulates the flowing fluid (e.g. gas, steam, water, etc.) to correct the changes resulting from the load disturbances.

There are a wide variety of control valves that are in commercial use. These include ball valves; gate valves; check valves; and butterfly valves, among others. Some control valves may include hydraulic actuators (e.g. pilots). These valves respond to changes of pressure or flow to open or close the valve in response to those changes. In some pilot driven control valves the fluid pressure is used to open and close the valve. Other control valves may be responsive to signals generated by independent devices such as flow meters or temperature transmitters.

Some control valves make use of a pilot or pressure amplifier to improve the sensitivity of the control valve to pressure variations. Pilot driven control valves include a pilot valve, a main valve, a pressure conduit, a dome, a piston and a seat. Pressure from the upstream side is provided to the dome often by a small pitot tube. The upstream pressure tries to push the piston open but it is opposed by that same pressure because the pressure is routed around to the dome above the piston. The area of the piston exposed to pressure is larger in the dome than it is on the upstream side; the result is a net sealing force. The pressure from the pitot tube to the dome is routed through the actual control pilot valve. There are many designs but the control pilot is essentially a conventional pressure reducing valve with a stem and a plug that control pressure to the main valve dome. When the pilot valve reaches a set pressure it opens and releases the pressure from the dome. The piston is then free to open and the main valve exhausts the system fluid. In some cases the control pilot opens either to the main valve exhaust pipe or to atmosphere.

The stem of the control valve usually include a packing box (e.g. packing around the valve stem) to prevent leakage of fluids. However, packing box leakage is a common problem and is a large contributor to fugitive emissions in process applications. Several factors exacerbate the problem. For instance, the concentration of hydrogen sulfide in hydrocarbons in some processes is increasing significantly with the shift of production to more challenging oil and gas fields. These compounds negatively impact the performance of the packing box and consequently affect the performance of the control valve.

BRIEF DESCRIPTION OF THE INVENTION

In accordance with one exemplary non-limiting embodiment, the invention relates to a valve having a housing with an upstream port and a downstream port. The valve includes a pilot assembly coupled to the upstream port and a plunger adapted to engage and displace the pilot assembly. A proportional solenoid electromagnetically coupled to the plunger. The valve also includes a main valve fluidly coupled to the pilot assembly having a main valve plug and a piston coupled to the main valve plug. The valve is also provided with a displacement measurement component coupled to the piston that measures displacement of the piston.

In some embodiments the displacement measurement component may include a position indicia component and a sensor to detect changes in position indicia component.

In some embodiments, the valve may include an electronic valve controller coupled to the proportional solenoid.

In another embodiment, a flow control system includes a pilot driven valve having a pilot assembly and a main valve assembly. A displacement measurement component is coupled to the main valve assembly indicating displacement of the main valve assembly. The flow control system includes a proportional solenoid responsive to a signal from the displacement measurement component that displaces the pilot assembly in proportion to the changes in displacement of the main valve assembly.

In another embodiment, a method of controlling a valve having a pilot assembly, a main valve assembly and a proportional solenoid coupled to the pilot assembly, the method includes sensing a displacement of the main valve assembly and modulating the proportional solenoid in response to the displacement of the main valve assembly.

Other features and advantages of the present invention will be apparent from the following more detailed description of the preferred embodiment, taken in conjunction with the accompanying drawings which illustrate, by way of example, the principles of certain aspects of the invention.

DETAILED DESCRIPTION OF THE INVENTION

Figure 1:
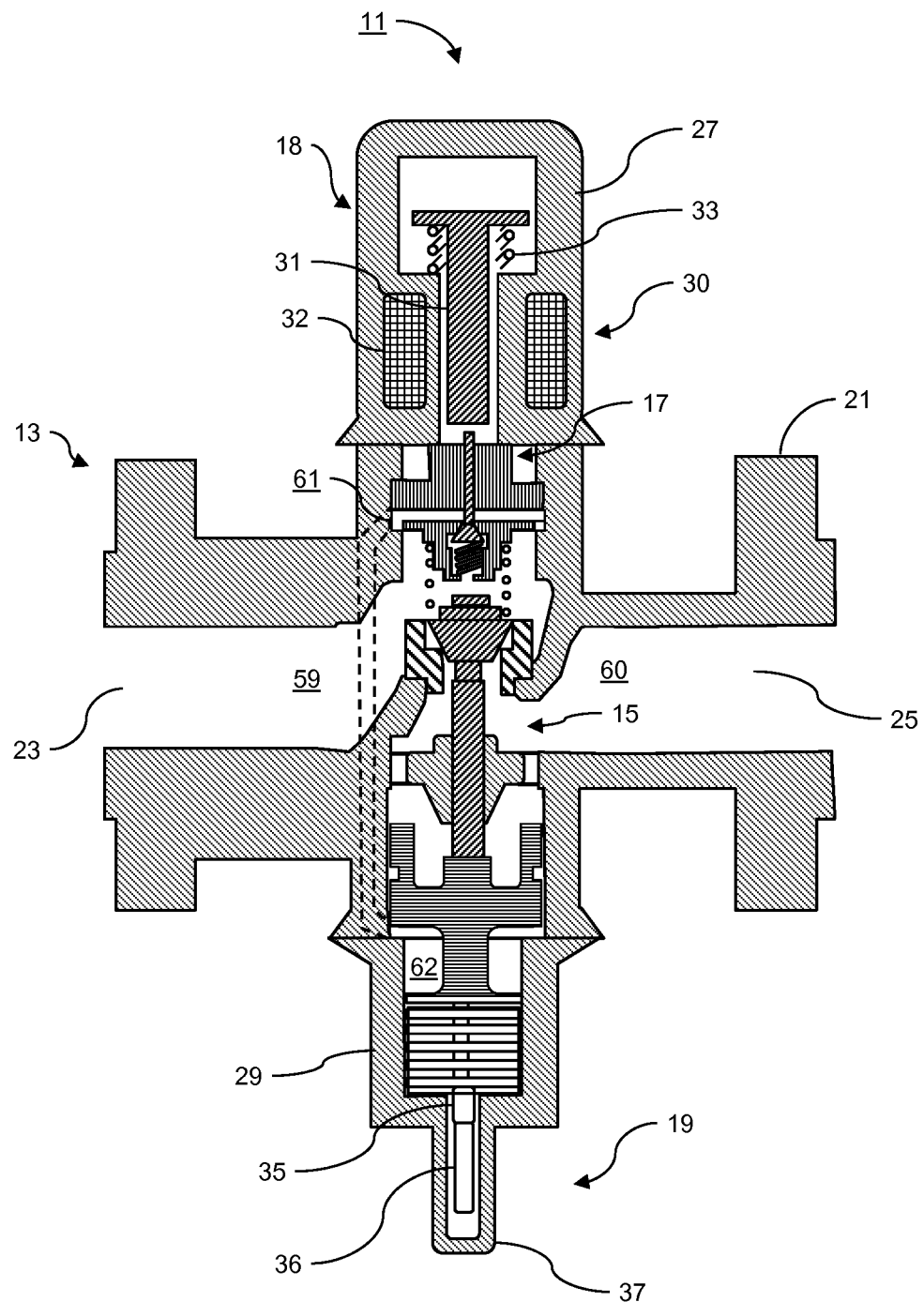
FIG. 1 is a cross sectional view of an embodiment of a process fluid actuated pilot operated control valve.

Illustrated in FIG. 1 is an embodiment of a control valve 11. The control valve 11 includes a housing assembly 13, a main valve assembly 15, and a pilot assembly 17. The control valve 11 also includes a proportional solenoid 30 electromagnetically coupled to the pilot assembly 17 and a position indicator assembly 19 coupled to the main valve assembly 15.

The housing assembly 13 may include a main housing body 21, an inlet port 23, and an outlet port 25. The housing assembly may also include an upper casing 27, and a lower casing 29.

As illustrated in FIG. 1, the solenoid assembly 18 may include a proportional solenoid 30 having a plunger 31 that acts as an armature and a coil 32 disposed in the upper casing 27 of the housing assembly 13. The solenoid assembly 18 may also include a plunger spring 33 that biases the plunger 31 in an upward direction.

The position indicator assembly 19 includes a rod 35, a position indicator 36, (e.g. a magnet) disposed within a non-magnetic pressure boundary 37.

Figure 2:
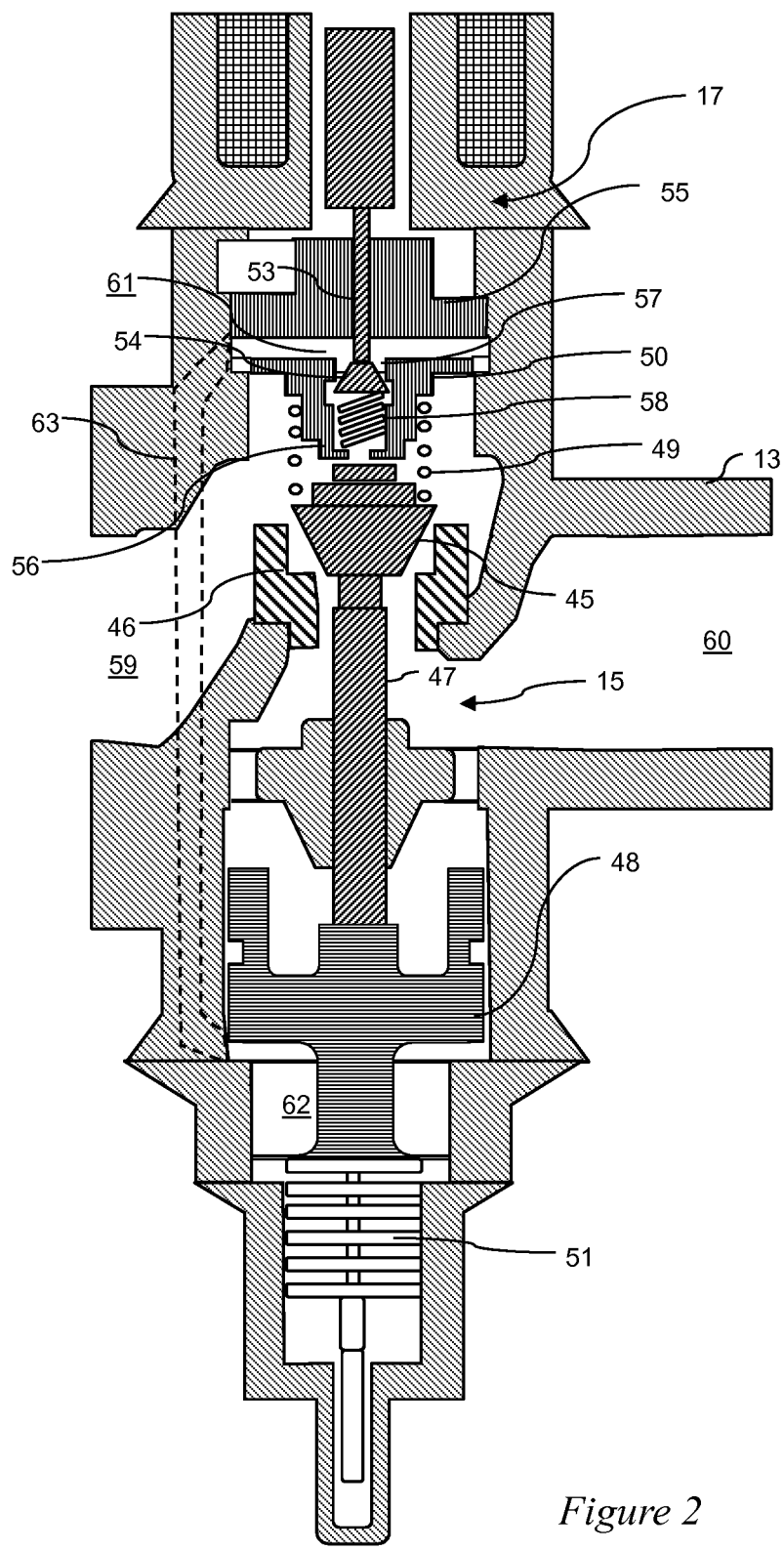
FIG. 2 is a cross sectional view of the main valve assembly and the pilot valve assembly of the process fluid actuated pilot operated control valve according to an embodiment.

Illustrated in FIG. 2 are the components of the main valve assembly 15 and the pilot assembly 17 of an embodiment of the control valve 11. The main valve assembly 15 is disposed within the housing assembly 13. The main valve assembly 15 may include a main valve plug 45 that engages a main valve seat 46. The main valve plug 45 is coupled to main valve stem 47 which in turn may be coupled to a piston 48. The main valve plug 45 is biased in a downward position by main valve spring 49 that is held in place by main valve spring retainer 50. The piston 48 may be coupled to a dashpot 51 which may dampen the motion of the piston 48.

The pilot assembly 17 includes a pilot stem 53 coupled to a pilot plug 54. The pilot stem 53 and the pilot plug 54 are disposed in a pilot valve housing 55 which may be integrally formed with main valve spring retainer 39. A pilot spring retainer 56 may be formed in the pilot valve housing 55. Pilot spring 58 may be disposed inside the pilot spring retainer 56 and coupled to the pilot plug 54, The pilot spring 58 biases the pilot plug in an upward direction. The pilot spring retainer 56 may include a pilot seat 50 that is engaged by the pilot plug 54 when in the closed position.

The housing assembly 13, the main valve assembly 15 and the pilot assembly 17 define a first chamber 59, a second chamber 60, a third chamber 61 and a fourth chamber 62. The housing assembly 13 may also include a fluid conduit 63 connecting the second chamber 60 with the fourth chamber 62.

Figure 3:
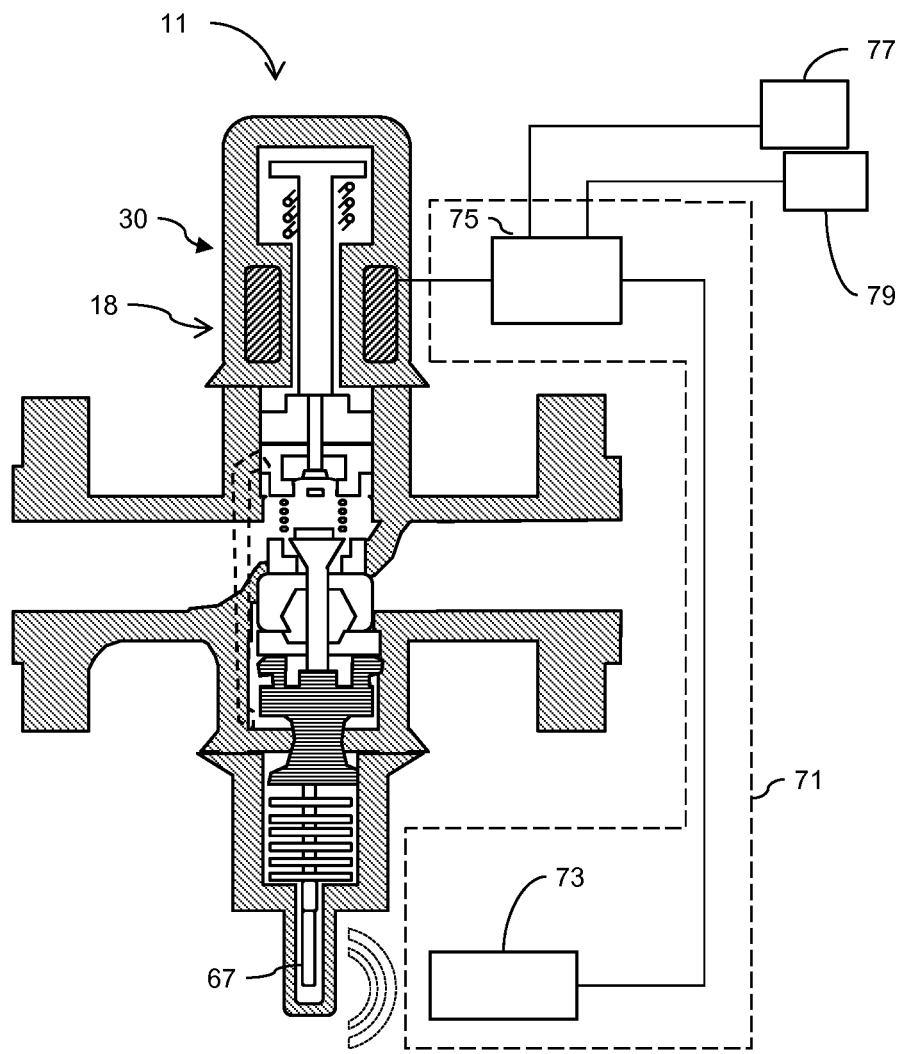
FIG. 3 is a schematic of an embodiment of a control valve system showing the sensor and control elements.

Illustrated in FIG. 3 is a valve control system 71. The valve control system 71 includes a position sensor 73 that detects displacement of the position indicator 36. Examples of position sensor 73 may include a Hall effect sensor or a magnetorestrictive sensor, among others. The position sensor 73 and the position indicator 36 serve as a displacement measurement component that measures displacement of the main valve assembly 15.

The valve control system 71 includes a valve controller 75 that receives signals from the position sensor 73 and may receive signals from a process controller 77 that controls processes in a larger system. Based on those signals, the valve controller 75 modulates proportional solenoid 18 based upon the displacement of the position indicator 36. The valve control system 71 may be separate or integral with the controller 79.

The valve control system 71 may include an electrical supply 79 that powers the valve controller 75, the position sensor 73, and the proportional solenoid 18. The use of position indicator 36 and position sensor 73 may be accomplished without the need for a separate power supply as in the case of linear variable differential transformer (LVDT). Simplified wiring will result in the use of a two-wire rather than four-wire hookup.

FIG. 1 illustrates the control valve 11 in the closed position. Fluid from the inlet port 23 is prevented from flowing to and through outlet port 25 by main valve plug 45. Main valve plug 45 is tightly seated against main valve seat 33 by the compression force exerted by main valve spring 49 and the differential fluid pressure acting on the main valve plug 45. In the closed position, pilot plug 54 is tightly seated against the pilot seat 57 by the force applied by pilot spring 58.

When control valve 11 is actuated, coil 32 is energized, forcing plunger 31 to be displaced downwardly. The displacement of plunger 31 causes the displacement of pilot stem 53 and pilot plug 54. The force applied by plunger 31 overcomes the force applied by pilot spring 58. This movement unseats pilot plug 54 from pilot seat 57 thereby allowing fluid to enter third chamber 61. Fluid from the inlet port 23 flows through the third chamber 61 through the fluid conduit 63 and into the fourth chamber 62. The increased pressure in the fourth chamber 62 displaces the piston 48 which in turn unseats the main valve plug 45 from the main valve seat 46. The displacement of main valve plug 45 allows flow from first chamber 59 to the second chamber 60.

The displacement of the piston 48 causes the displacement of the position indicator 36. The displacement of the position indicator 36 is detected by the position sensor 73 which may provide a signal to the process controller 77 and/or valve controller 75. This position feedback enables the valve controller 75 to control the flow through the control valve 11 through the modulation of the solenoid assembly 18.

Figure 4:
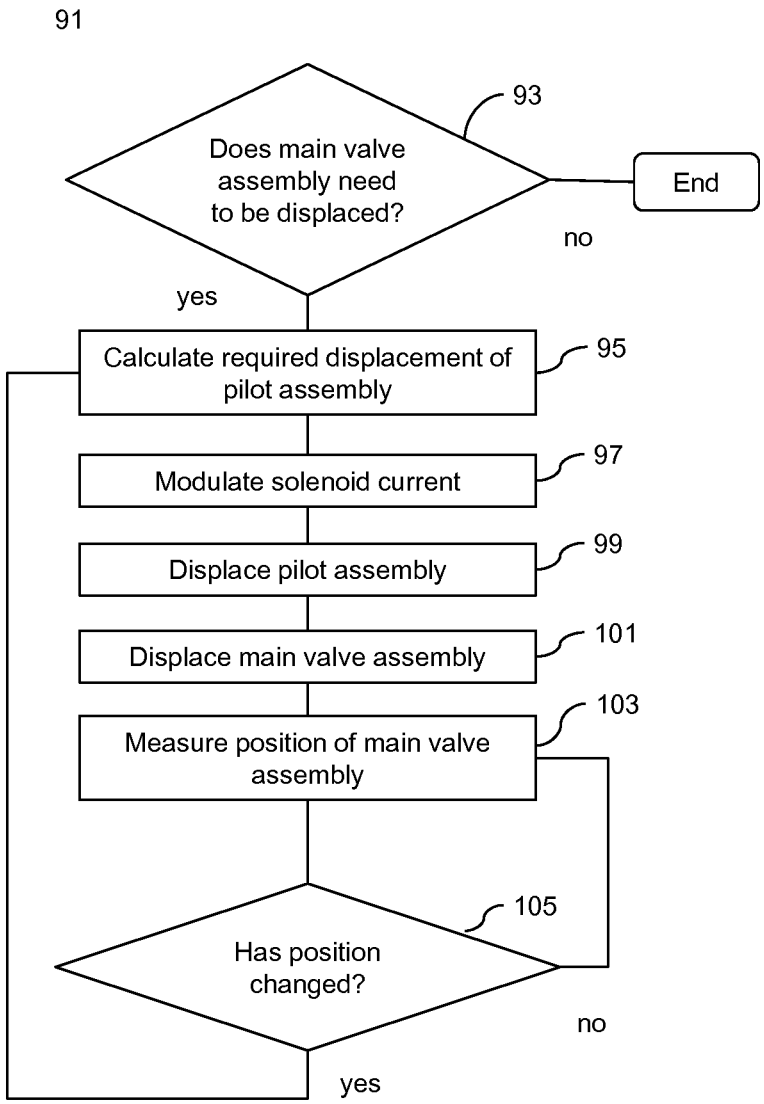
FIG. 4 is a flow chart illustrating an exemplary method implemented by a process fluid actuated pilot operated control valve.

FIG. 4 is a flowchart illustrating a method of controlling a control valve 11 (method 91). A determination is made as to whether the main valve assembly 15 needs to be displaced (method element 93). If the main valve assembly 15 needs to be displaced the required displacement of the pilot assembly 17 is calculated (method element 95). Current is applied to the solenoid assembly 18 (method element 97), leading to the displacement of the main valve assembly 15 (method element 101). After setting the position of the main valve assembly 15, the position of the main valve assembly 15 is measured periodically (method element 103). The system then determines whether the position of the main valve assembly 15 has changed as a result of any disturbance (method element 105). If the position of the main valve assembly 15 has changed the process is repeated by initially calculating the required displacement of the pilot assembly.

Figure 5:
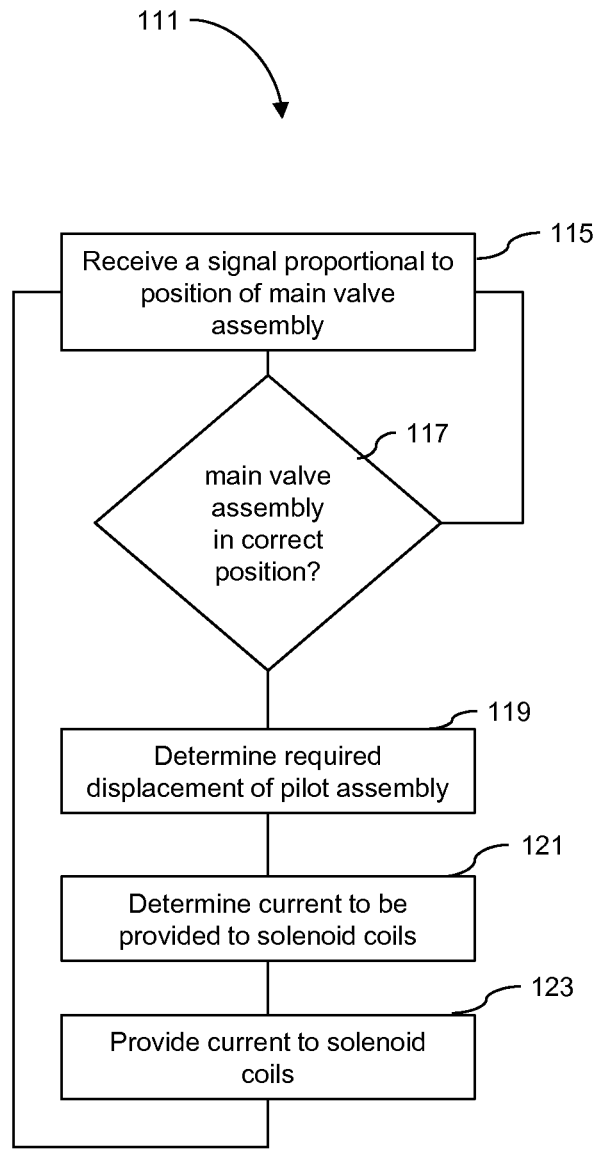
FIG. 5 is a flowchart illustrating a second exemplary method implemented by process fluid actuated pilot operated control valve.

FIG. 5 illustrates a method 111 that may be implemented by valve controller 75. The valve controller 75 may receive a signal from the position sensor 73 that is proportional to the position of the main valve assembly (method element 115). The valve controller 75 may then make a determination as to whether the main valve assembly is in the correct position (method element 117). If the main valve assembly 15 is not in the correct position, the valve controller 75 may then make a determination of the required displacement of the pilot assembly 17 to compensate for the position error (method element 119). Based on the required displacement of the pilot assembly 17, the valve controller 75 may then determine the current to be provided to the solenoid coils 32 to displace the pilot assembly 17 by the required displacement (method element 121). The valve controller 75 may then provide the appropriate current to the solenoid coils 32 to effect the required displacement of the pilot assembly 17. It should be noted that although in the embodiment described in this example the valve controller 75 may be a standalone component, it would be apparent to one of ordinary skill in the art to include the valve controller 75 as a component of a larger system such as process controller 77.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed:

1. A valve comprising:
    a housing having an upstream port and a downstream port;
    a pilot assembly coupled to the upstream port;
    a plunger adapted to engage and displace the pilot assembly;
    a proportional solenoid electromagnetically coupled to the plunger;
    a main valve fluidly coupled to the pilot assembly, the main valve comprising,
        a main valve plug; and
        a piston coupled to the main valve plug; and
    a displacement measurement component coupled to the piston that measures displacement of the piston.

2. The valve of claim 1, further comprising a conduit coupled to the upstream port and the pilot assembly.

3. The valve of claim 1, wherein the displacement measurement component comprises a position indicia component and a sensor to detect changes in position indicia component.

4. The valve of claim 3, wherein the sensor comprises one selected from among a group consisting of Hall effect sensors and magneto restrictive sensors.

5. The valve of claim 1, further comprising an electronic valve controller coupled to the proportional solenoid.

6. The valve of claim 5, wherein the electronic valve controller receives a displacement signal from the displacement measurement component and activates the proportional solenoid in response to the displacement signal.

* * * * *